O. J. BEREND.
SAFETY DEVICE FOR RAILWAYS.
APPLICATION FILED JAN. 7, 1909.
939,201.
Patented Nov. 9, 1909.
2 SHEETS—SHEET 1.
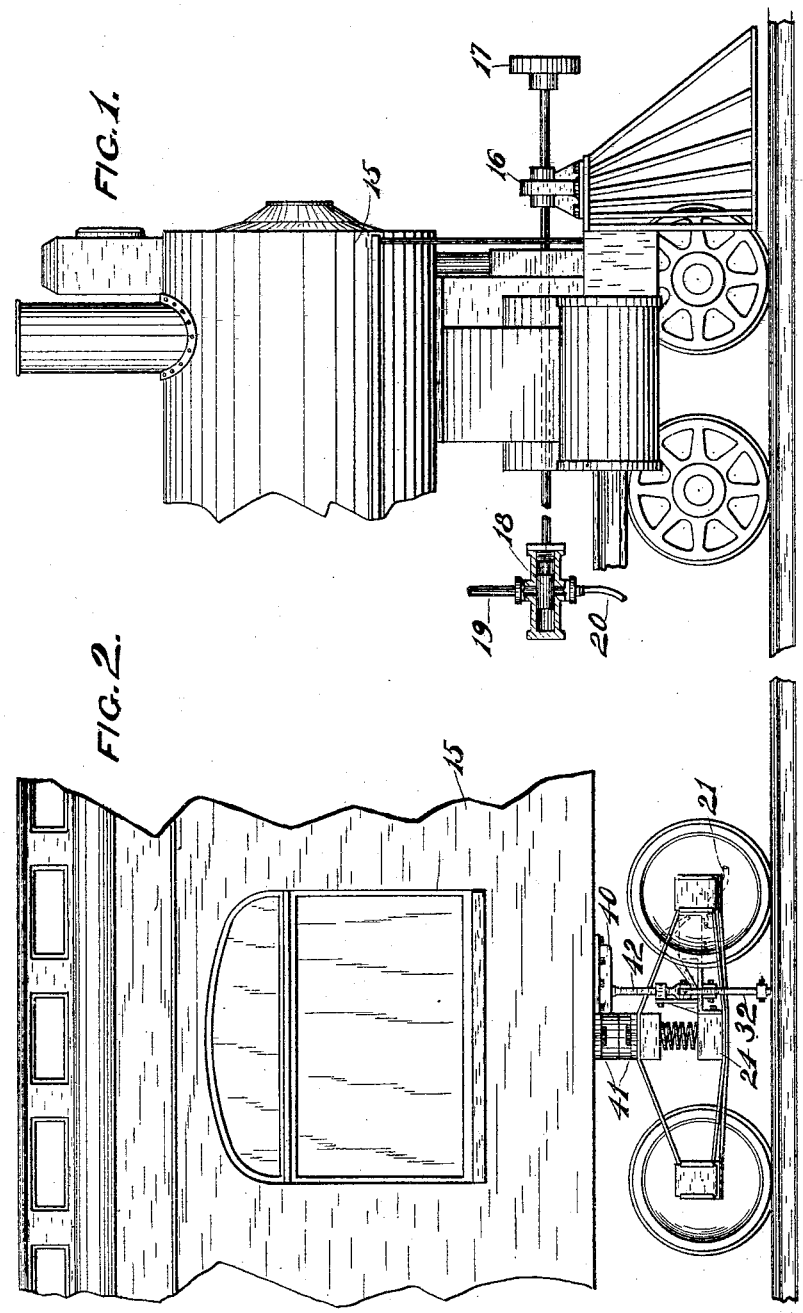
WITNESSES.
INVENTOR.
Oscar J. Berend.
By Benedict, Morsell & Caldwell
ATTORNEYS.

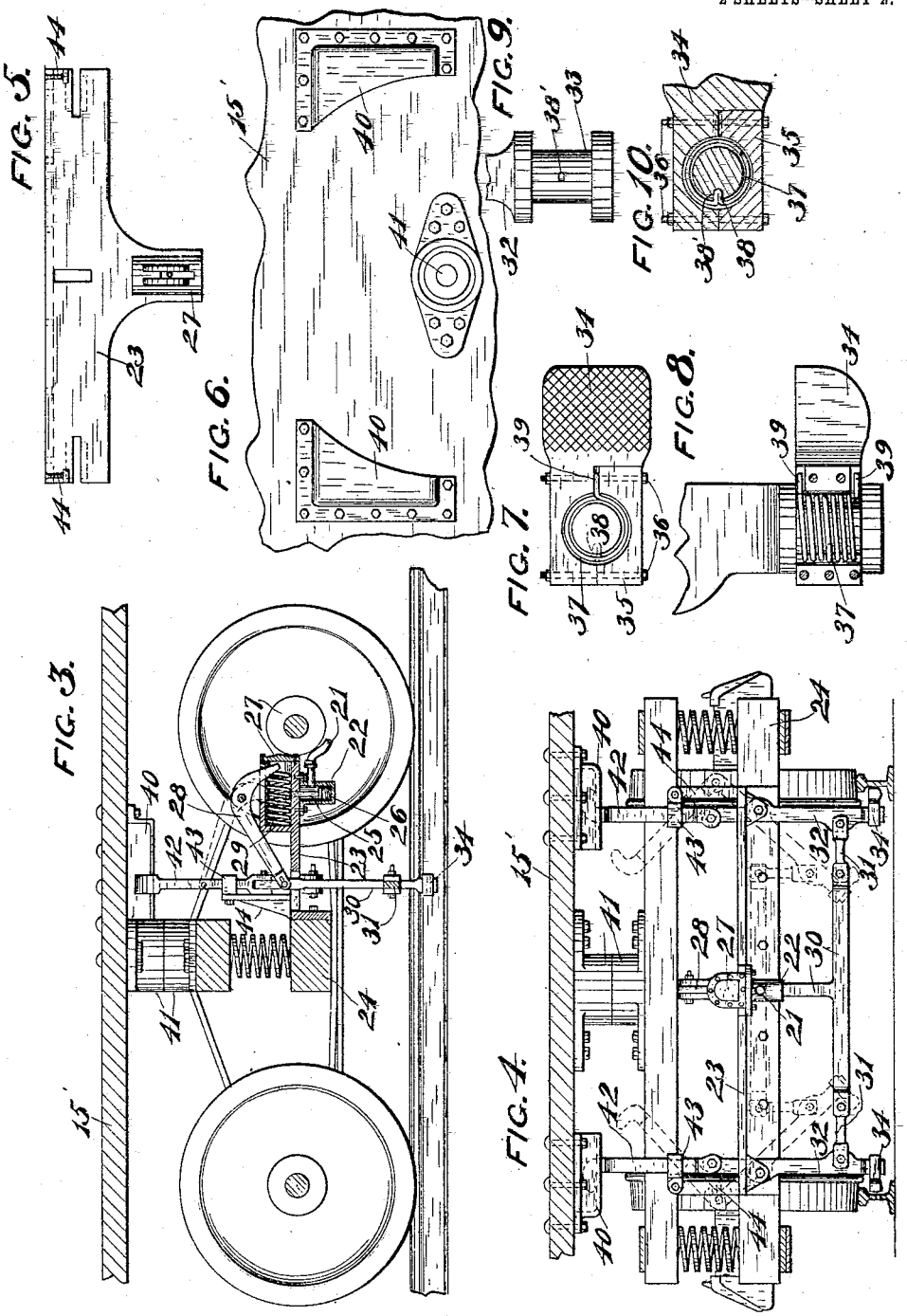

UNITED STATES PATENT OFFICE.

OSCAR J. BEREND, OF MILWAUKEE, WISCONSIN.

SAFETY DEVICE FOR RAILWAYS.

939,201. Specification of Letters Patent. Patented Nov. 9, 1909.

Application filed January 7, 1909. Serial No. 471,081.

*To all whom it may concern:*

Be it known that I, OSCAR J. BEREND, residing in Milwaukee, in the county of Milwaukee and State of Wisconsin, have invented new and useful Improvements in Safety Devices for Railways, of which the following is a description, reference being had to the accompanying drawings, which are a part of this specification.

This invention has for its object to provide means for preventing railroad cars leaving the track in event of collision and comprises arms carried by the trucks of the cars having shoes on their ends adapted to engage beneath the heads of the rails when moved from their normally raised position, and other arms operating therewith to engage the car bottom, there being a means provided on the locomotive for causing the engagement of the arms in event of a collision.

With the above and other objects in view the invention consists in the safety device for railways herein claimed, its parts and combinations of parts and all equivalents thereof.

Referring to the accompanying drawings in which like characters of reference indicate the same parts in the several views; Figure 1 is a detail view of the front portion of a locomotive provided with an actuating means which may constitute a part of the safety device for railroads of this invention; Fig. 2 is a detail view of a portion of a passenger car with the safety device of this invention applied thereto; Fig. 3 is a central sectional view of the truck thereof showing the clutch arms of the safety device in their engaged position; Fig. 4 is a front elevation thereof, the normal position of the parts being shown in dotted lines; Fig. 5 is a detail view of the base plate; Fig. 6 is an inverted plan view of the engaging plates on the car bottom; Fig. 7 is a detail plan view of one of the rail shoes; Fig. 8 is an elevation thereof with one section removed; Fig. 9 is a detail view of the end of the clutch arms with the shoe removed; and, Fig. 10 is a sectional view of the connection between the clutch arm and the rail shoe.

In these drawings 15 indicates a locomotive which has slidably mounted in a bearing 16 on its pilot a plunger 17 carrying a valve 18 which controls the flow of compressed air from a compressed air supply pipe 19, leading from a source of compressed air supply, such as the main reservoir of the air brake system, to a train pipe 20 which leads to all of the cars of the train and connects with branch pipes 21 for each truck.

Each branch pipe 21 is connected with a cylinder 22 mounted on a base plate 23 carried by the truck bolster 24 and the compressed air actuates a piston 25 therein which is under the influence of a coil spring 26. The stem of piston 25 projects through the base plate into a casing 27 formed on the base plate when in its normal position and engages the end of a bell crank lever 28 which is pivoted between ears on the top of the casing and projects through a slot thereof to receive the action of a strong coil spring 29 confined within the casing.

In the normal position of the parts the longer arm of bell crank lever 28 is in a raised position, as shown by dotted lines in Fig. 3, and the shorter arm thereof holds the spring 29 under compression and is caught by the end of the trip piston 25, but when the trip piston is withdrawn, due to the pressure admitted to its cylinder upon the valve 18 being opened by a movement of plunger 17, the parts assume the position shown in Fig. 3, the spring 29 throwing the bell crank lever 28.

A T-shaped rod 30 is suspended by its stem member from the longer end of bell crank lever 28 and is connected at its ends by means of links 31 to clutch arms 32 which are pivoted to ears on the ends of the base plate 23 and pass through slots therein. The lower end of each clutch arm 32 is provided with a reduced portion 33, as shown in Fig. 9, to receive a rail shoe 34 which is formed in sections surrounding such reduced portion, the cap member 35 thereof being clamped to the other member by bolts 36 passing therethrough. A coil spring 37 with an inwardly projecting lug 38 at its middle portion fits in the space between the rail shoe and the clutch arm, surrounding the reduced portion of the latter, and has its lug 38 fitting within a notch 38' in the clutch arm and its projecting ends 39 engaged between the sections of the rail shoe, so that though the rail shoe is permitted to have a slight swing in either direction from its normal position, it is quickly returned by the action of one part or the other of the coil spring 37. The coil spring 37, by being fastened at its middle part, constitutes in effect two springs in opposition to each other, tending to keep the shoe in its normal position. The object of the slight movement of the rail shoe 34 on the clutch arm 32 is to enable it to yield slightly so as to pass by the fish plates of the rail, for when the spring 29 is released, upon a collision occurring, the rod 30 is forcibly moved downwardly thereby and causes the clutch arms 32 to swing apart as toggle joints to bring the rail shoes beneath the heads of the rails. The degree of movement of the rail shoes on the clutch arms is limited by the tightening of the coil spring 37, so that only the fish plates may be passed by them, and should there be a tendency for the car to leave the track the engagement of the rail shoes beneath the rail heads will effectively clutch the trucks to the rails and avoid that possibility.

In order that the strain at such times may not come entirely upon the king bolts of the trucks, provision is made for clutching the trucks to the car bottom. Arc shaped engaging plates 40 are secured to the bottom of the car body and afford curved engaging edges spaced from the car bottom and concentric with the king bolt 41. Hook shaped engaging arms 42 are pivotally mounted on the upwardly extending ends of the clutch arms 32 and ride in swinging guide loops 43 which are pivotally mounted on standards 44 at the ends of the base plate 23. Thus, when the clutch arms 32 are swung apart upon the engine meeting with an obstruction, as before described, the engaging arms 42 are also swung apart and slide upwardly in their guide loops 43 to engage with the curved edges of the engaging plates 40, to securely lock the trucks to the car bottoms. This engagement of the hooked engaging arms 42 with the plates 40 will be effected whatever the position of the truck with relation to the car body may be, that is to say, if the train is on a curve and the truck is swung on its king bolt to an angular position with relation to the car body, the curvature of the engaging edges of the plates 40 permits the hooked arms 42 to make their engagement as well as when the truck is straight.

From the foregoing it will be understood, that this invention provides an automatic means for clutching the trucks to the rails as soon as the locomotive meets with an obstruction and thus the cars are prevented from leaving the track and piling up one upon another or becoming ditched, and also the car bottoms are clutched to the car trucks to prevent the cars leaving their trucks by breaking loose from their king bolts.

Obviously the system may be provided with a means for hand control from the cab of the locomotive by arranging for a movement of the valve 18 by hand or by another valve for admitting compressed air to the train pipe 20.

What I claim as my invention and desire to secure by Letters Patent is;

1. A safety device for railways, comprising a clutching means carried by the trucks of the cars for engaging beneath the heads of the rails, pneumatically controlled operating mechanism for the clutching means, and pneumatic actuating means on the locomotive for releasing the operating means.

2. A safety device for railways, comprising pivotally mounted clutch arms, a lever having connection with the clutch arms, a spring bearing on the lever, a pneumatically released trip pin engaged by the lever to normally resist the action of the spring and hold the clutch arms away from the rails, and means on the locomotive for controlling the admission of pressure to the pneumatically operated trip pin.

3. A safety device for railways, comprising swinging clutch arms pivotally mounted on the trucks and adapted to engage beneath the heads of the rails, hooked engaging arms movable therewith, engaging plates on the car bottom to be engaged by the hooked engaging arms, and means on the locomotive for causing the engagement of the clutch arms and the engaging arms.

4. A safety device for railways, comprising swinging clutch arms mounted on the car truck, and adapted to engage beneath the heads of the rails, a rod having connections with the clutch arms, a bell crank lever having one arm pivotally connected to the said rod, a coil spring bearing on the other arm of the bell crank lever, a piston fitting in a cylinder and having its stem projecting in the path of the bell crank lever, and means on the engine for causing the admission of pressure to the cylinder to release the piston stem from the path of the bell crank lever and permit the spring to throw the clutch arms into engagement with the rails.

5. A safety device for railways, comprising swinging clutch arms mounted on the car truck, and adapted to engage beneath the heads of the rails, a rod having connections with the clutch arms, a bell crank lever having one arm pivotally connected to said rod, a coil spring bearing on the other arm of the bell crank lever, a piston fitting in a cylinder and having its stem projecting in the path of the bell crank lever, hooked engaging arms connected with the clutch arms, arc shaped engaging plates secured to the car bottom and adapted to be engaged by the engaging arms, and means on the engine for causing the admission of pressure to the cylinder to release the piston stem from the path of the bell crank lever and permit the spring to throw the clutch arms into engagement with the rails and the engaging arms into engagement with the engaging plates.

6. A safety device for railways, comprising a base plate adapted to be secured to the bolster of a car truck, clutch arms pivotally connected thereto and adapted to swing into engagement with the under side of the rail heads, a T-shaped rod passing through an opening in the base plate, links connecting the ends of the rod with the clutch arms, a casing on the base plate, a bell crank lever pivoted in ears thereof and having one end connected with the T-shaped rod and the other end projecting through a slot into the casing, a coil spring in the casing bearing on the end of the bell crank levers, a cylinder secured to the base plate, a spring pressed piston therein passing through the base plate and projecting into the path of the bell crank lever, pipe connections between the cylinder and the locomotive, and means on the locomotive for supplying pressure to the pipe connections to release the piston from the bell crank lever and permit the spring to throw the clutch arms into engagement with the rails.

7. A safety device for railways, comprising a base plate adapted to be secured to the bolster of a car truck, clutch arms pivotally connected thereto and adapted to swing into engagement with the under side of the rail heads, a T-shaped rod passing through an opening in the base plate, links connecting the ends of the rod with the clutch arms, a casing on the base plate, a bell crank lever pivoted in ears thereof and having one end connected with the T-shaped rod and the other end projecting through a slot into the casing, a coil spring in the casing bearing on the end of the bell crank lever, a cylinder secured to the base plate, a spring pressed piston therein passing through the base plate and projecting into the path of the bell crank lever, standards on the base plate, swinging loops thereon, hooked engaging arms pivotally connected to the ends of the clutch arms, arc shaped engaging plates on the car body adapted to be engaged by the hook engaging arms, pipe connections between the cylinder and the locomotive, and means on the front of the locomotive for automatically supplying pressure to the pipe connections on the locomotive meeting with an obstruction to release the piston from the bell crank lever and permit the spring to throw the clutch arms into engagement with the rails and the hooked engaging arms into engagement with the engaging plates.

8. A safety device for railways, comprising clutch arms pivotally mounted on the car truck, means for moving the clutch arms toward the rails, and rail shoes mounted on the clutch arms for engaging beneath the heads of the rails and having a limited yielding movement thereon to permit them to pass by the fish plates of the rails.

9. A safety device for railways, comprising clutch arms pivotally mounted on the car truck and provided with reduced portions at their ends, means for moving the clutch arms toward the rails, rail shoes loosely mounted on the reduced portions of the clutch arms and adapted to engage beneath the rail heads, and coil springs between the clutch arms and the rail shoes for permitting a limited yielding movement thereof to pass by the fish plates.

In testimony whereof, I affix my signature, in presence of two witnesses.

OSCAR J. BEREND.

Witnesses:
R. S. C. CALDWELL,
ANNA F. SCHMIDTBAUER.